United States Patent [19]
Barb

[11] 3,894,716
[45] July 15, 1975

[54] FLUID CONTROL MEANS HAVING PLURALITY DISCS

[75] Inventor: Gayle E. Barb, Houston, Tex.

[73] Assignee: ACF Industries, Incorporated, New York, N.Y.

[22] Filed: Dec. 26, 1973

[21] Appl. No.: 427,751

[52] U.S. Cl. ........ 251/127; 137/625.3; 137/625.37; 138/42
[51] Int. Cl.² .......................................... F15D 1/04
[58] Field of Search .... 251/127; 137/625.3, 625.37; 138/42, 43

[56] References Cited
UNITED STATES PATENTS

| | | | |
|---|---|---|---|
| 540,270 | 6/1895 | Parker | 138/43 UX |
| 2,008,722 | 7/1935 | McClintock | 138/43 |
| 2,631,612 | 3/1953 | Buescher | 251/127 X |
| 3,131,717 | 5/1964 | Gratzmuller | 251/127 X |
| 3,514,074 | 5/1970 | Self | 251/127 |
| 3,744,762 | 7/1973 | Schlicht | 138/42 X |

FOREIGN PATENTS OR APPLICATIONS

| | | | |
|---|---|---|---|
| 1,008,977 | 11/1957 | Germany | 251/127 |

Primary Examiner—Henry T. Klinksiek
Attorney, Agent, or Firm—Eugene N. Riddle

[57] ABSTRACT

A valve structure having a valve body with a valve plug mounted therein and a plurality of stacked annular members extending about the valve plug in the closed position. The annular members are spaced from each other to provide a fluid flow path therebetween and each has an imperforate body portion with a plurality of radially spaced ribs projecting from opposite sides of the imperforate body portion to form successive stages of pressure reduction as the fluid flows between the spaced annular members.

2 Claims, 4 Drawing Figures

FLUID CONTROL MEANS HAVING PLURALITY DISCS

BACKGROUND OF THE INVENTION

The damaging effects resulting from the velocity of high pressure flowing fluids may be reduced by effecting a high energy change or dissipation of energy. If the fluid is in a liquid state and liable to flash, that is, to vaporize or turn to a gaseous condition on the downstream side of the valve, it may condense implosively and induce damaging shock waves, cause erosion, and the like. For example, hot water or other liquid may flash or cavitate to steam or gas as it passes at high velocity through the valve opening and may then recondense downstream with implosive action, resulting in an energy change and inducing high energy shock waves that may severely damage and erode the downstream portion of a valve.

The high velocity attained by the flowing fluid as it passes through the valve affects the life and application of the control valve. As the velocity of the fluid in the valve exceeds the velocity of the fluid in the line, several reactions occur. One problem is the erosion of the valve plug by direct impingement of the liquid or droplets and suspended foreign particles in either a gas or liquid. Additional erosion results from cavitation or a high speed implosion of vapor against the trim and body. Other problems created by the high fluid velocity in the valve include severe noise generation, trim fatigue, and possible degradation of flowing fluid materials.

The above problems have been widely recognized throughout the valve industry for many years. Attempted solutions have included the dissipation of energy of a flowing high pressure fluid by subdividing it into a plurality of passageways in which there are changes in direction such as a grid assembly providing tortuous courses for the fluid. This results in a pressure drop as a function of changes in direction.

A stack of discs or annular members about a valve plug has been employed heretofore. For example, the Self U.S. Pat. No. 3,514,074 dated May 26, 1970 shows a plurality of stacked discs about a valve plug. However, each disc has flow passageways therein which subdivide the flow into a plurality of small flow streams each with multiple turns.

DESCRIPTION OF THE PRESENT INVENTION

The present invention is directed to a valve structure comprising a valve body having a valve plug mounted therein, and a stack of annular discs extending about the valve plug in its closed position and spaced from each other to permit the flow of fluid therebetween. Each annular disc has an imperforate body portion and a plurality of radially spaced annular or concentric ribs extending from opposite sides of the imperforate body portion. The concentric ribs on adjacent facing discs are spaced a progressively increasing distance from each other in an outward direction to provide a constantly increasing spacing of the ribs from the adjacent annular member as the fluid flows from the inlet flow-way to the outlet flow-way. The progressively increasing spacing of the ribs from the adjacent annular member provides successive stages of pressure reduction which may be varied according to the requirements of the process fluid flowing through the valve. Such requirements might include the rate of flow, the total pressure drop desired, and the physical properties of the process fluid such as for example, viscosity, specific gravity, temperature, vapor pressure, and compressibility. The specific spacing of the discs from each other may be varied to provide a flow characteristic desirable for the specific process system.

BRIEF DESCRIPTION OF THE DRAWINGS

In the accompanying drawings in which two of several possible embodiments of the invention are illustrated.

Figure 1:
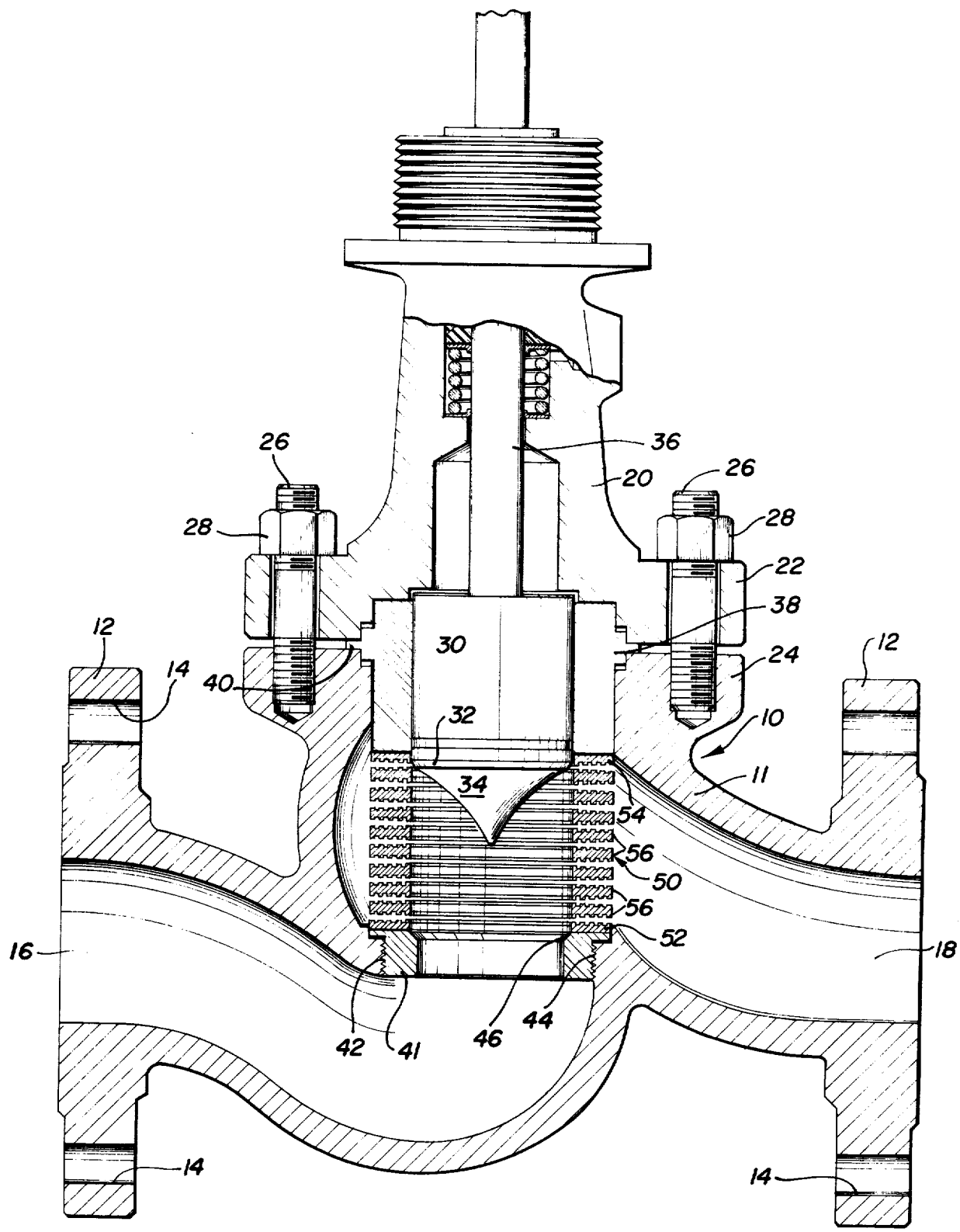
FIG. 1 is a sectional view of a portion of a plug valve structure incorporating the present invention.
Figure 2:
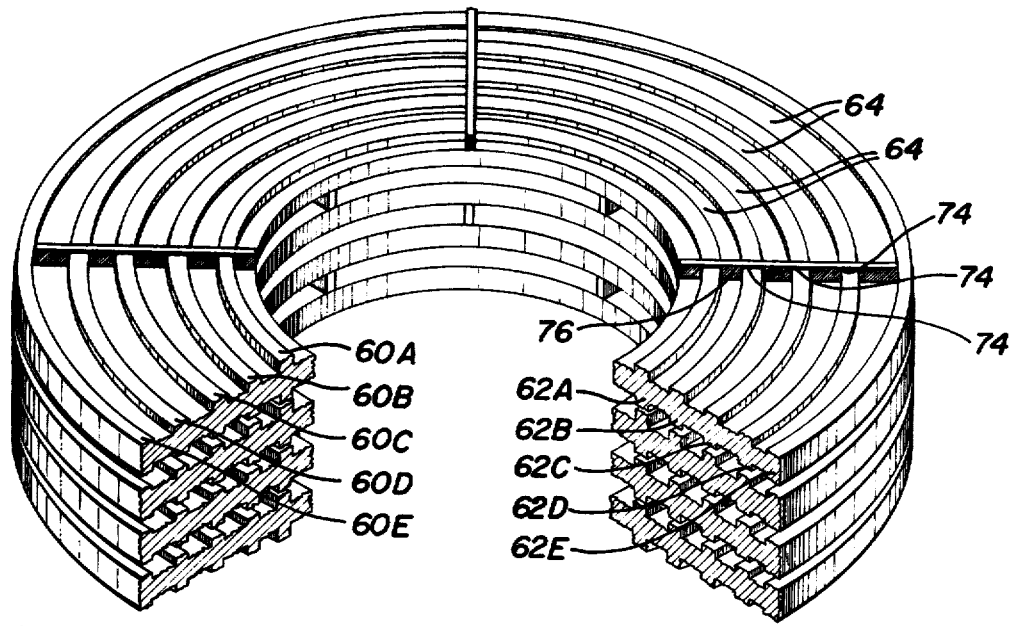
FIG. 2 is a perspective of the stack of discs shown in FIG. 1 removed from the valve plug.
Figure 3:
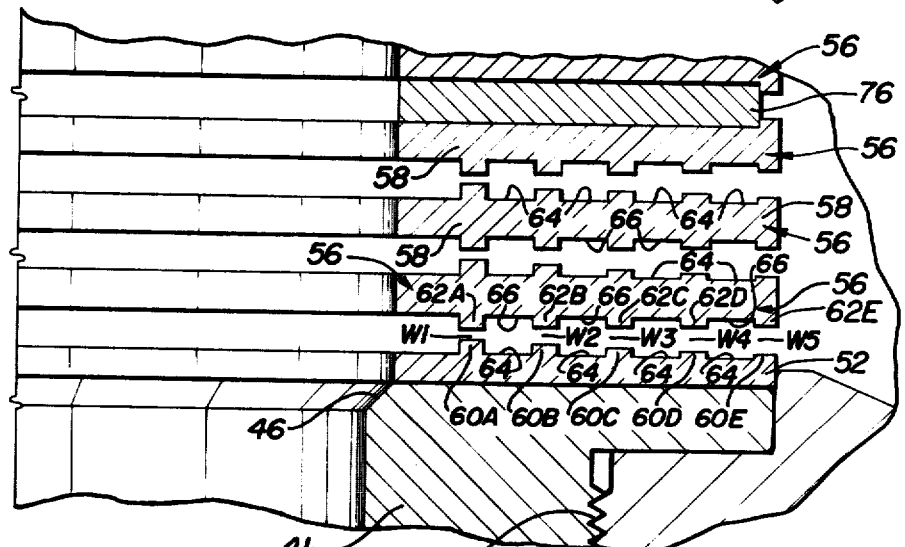
FIG. 3 is an enlarged fragment of FIG. 1 showing the plurality of annular discs arranged in a stack about the valve plug.

Referring now to the drawings for a better understanding of the invention, and more particularly to the embodiment shown in FIGS. 1–3, a control valve structure is generally indicated 10 comprising a valve body 11 with end flanges 12 thereon having openings 14. Flanges 12 may be suitably connected to adjacent facing flanges by suitable nut and bolt combinations to a suitable flowline (not shown). An inlet passageway is indicated at 16 and an outlet passageway is indicated at 18. A bonnet assembly 20 has a lower flange 22 facing body flange 24. Studs 26 secure bonnet 20 to body 11 by nuts 28.

A valve plug 30 has an annular contoured seat 32 thereon and a contoured lower end portion 34. A valve stem 36 is secured to plug 30 and may be connected to a suitable actuator such as a diaphragm type actuator (not shown) for reciprocation of valve plug 30 as is well known in the art.

An upper cage 38 has an outwardly extending flange 40 fitting between flanges 22 and 24. Cage 38 is secured in gripping relation between flanges 22 and 24. A lower seat ring 41 has external threads 42 and is threaded within an internally threaded opening 44 in valve body 11. Seat ring 41 has a seat 46 thereon which is adapted to seat against seat surface 32 on valve plug 30 in the closed position of valve plug 30. Mounted between seat ring 41 and cage 38 is a plurality of annular discs generally indicated 50 in which valve plug 30 is mounted for movement between an open position as shown in FIG. 1 and a closed position in which seat surface 32 is in intimate contact with seat 46. The rate of fluid flow from inlet passageway 16 to outlet passageway 18 may be controlled by the movement of valve plug 30.

The stack of discs generally indicated 50 includes a lower end disc 52 having a flat lower surface fitting against seat 41, an upper end disc 54 having an upper flat surface fitting against an adjacent surface on cage 38. A plurality of intermediate discs each generally indicated at 56 is mounted between end discs 52 and 54. Each intermediate disc 56 has an imperforate body portion 58. A plurality of upper annular ribs 60A, 60B, 60C, 60D, and 60E arranged in a concentric relation extend upwardly from each body portion 56. Lower ribs 62A, 62B, 62C, 62D, and 62E arranged in a concentric relation extend from the lower face of body portion 58 in vertically aligned relation with opposed upper ribs 60A–60E. Grooves 64 are arranged between upper annular ribs 60A–60E while grooves 66 are formed between lower ribs 62A–62E. Grooves 64 and 66 are of the same width to provide an equal spacing between the concentric ribs. The total number of discs and ribs may be dependent on the requirements of the process system.

To secure discs 52, 54, and 56, radially extending notches 74 are provided in upper ribs 60A–60E and lower ribs 62A–62E which receive spacers 76 fitting within notches 74. Spacers 76 may be secured such as by spot welding to the adjacent discs 52, 54, and 56. Spacers 76 between adjacent discs are staggered but may be aligned with respect to alternate discs. If desired, end disc 52 could be formed integrally with seat 41 and end disc 54 could be formed integrally with cage 38.

The gap or width between adjacent facing ribs is indicated by W1, W2, W3, W4 and W5 and is of an increasing spacing from inner ribs 60A, 62A to outer concentric ribs 60E, 62E. For example, with a valve plug 30 having a diameter, for example, of 2 inches, the outer diameter of discs 52, 54 and 56 may be 5 inches. The spacing W1–W5 would increase progressively dependent on the specific process requirements. For example, with the fluid comprising water at a flow rate of 600 gpm and a differential pressure of 475 psi, spacing W1 may be 0.073 inch, W2 may be 0.091 inch, W3 may be 0.109 inch, W4 may be 0.133 inch, and W5 may be 0.149 inch.

Figure 4:
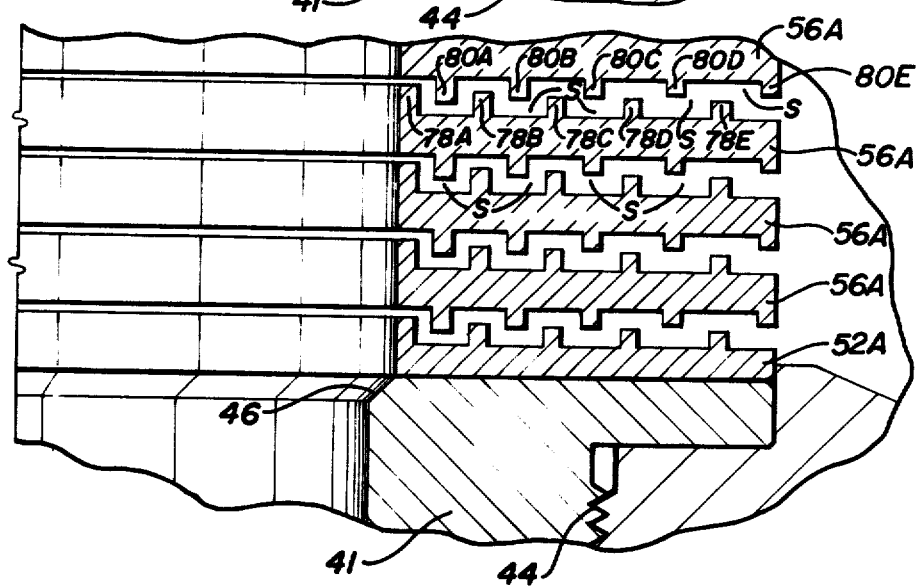
FIG. 4 is a sectional view similar to FIG. 3 but showing a modified form of the invention in which the ribs on opposed discs are staggered with respect to each other.

Referring now to FIG. 4 in which a modification of the invention is shown, the lower end disc 52A is provided at the lower end of the stack and a plurality of intermediate discs 56A are arranged over end disc 52A. Discs 56A have upper annular ribs 78A, 78B, 78C, 78D and 78E. Lower ribs of intermediate discs 56A are designated 80A, 80B, 80C, 80D and 80E. The lower ribs 80A–80E of discs 56A are staggered with respect to upper ribs 78A–78E of an adjacent facing disc 56A. The height of upper ribs 78A–78E and lower ribs 80A–80E decreases progressively in an outward direction from the inner peripheral surfaces of discs 52A and 56A to the outer peripheral surfaces of discs 52A and 56A. The spacing S between adjacent ribs of the same discs 52A and 56A increases progressively from the inner surface of discs 52A and 56A to the outer surface of discs 52A and 56A. For example, each rib may decrease in height an average of 0.010 inch. Likewise the spacing between adjacent ribs may increase constantly in width from between 0.010 inch and 0.030 inch, for example. The specific critical characteristics of the fluid in the flowline and the amount of pressure drop desired will determine the exact spacing between the ribs and the exact height of the ribs from the imperforate body of the discs.

From the foregoing it is to be understood that the present invention provides a stack of spaced discs each having an imperforate body portion and a plurality of ribs extending from each face. Ribs on opposed adjacent annular discs may be staggered with respect to each other or vertically aligned as desired. The flow passage of the fluid is defined between the discs and the spacing of the ribs and the height of the ribs may be obtained depending on the particular physical characteristics of the process fluid in the flowline and the pressure drop desired as the fluid flows between the plurality of discs. The height of the ribs decreases progressively from the inner circumference of the annular discs and the spacing between opposed ribs on adjacent discs thus increases progressively from the inner circumference of the discs to provide a flow path between the discs that is constantly increasing in size. If desired, the spacing between adjacent ribs on each disc may be increased progressively from the inner circumference of the disc to increase further the size of the flow path between adjacent discs.

What is claimed is:

1. A valve structure comprising a valve body having an inlet passageway extending in one direction and an outlet passageway extending in a second direction generally at right angles to said one direction, a valve plug mounted within said body for longitudinal back and forth axial movement to control the flow of fluid from the inlet passageway to the outlet passageway, and a stack of annular disc-like members in said valve body extending about and receiving the valve plug in its closed position with the annular members being spaced from each other to permit a flow of fluid therebetween in an open position of the valve plug, each of said annular members having an imperforate annular body portion of a generally uniform thickness and a plurality of spaced concentric ribs extending from opposite faces of the body portion with each annular body portion having aligned pairs of concentric ribs on said opposite faces, the concentric ribs on adjacent facing annular members being in opposed aligned relation to each other with the spacing between each successive pair of facing ribs progressively increasing in an outward direction, said ribs providing a resistance to flow of fluid between the annular members and resulting in successive pressure drops.

2. A valve structure as set forth in claim 1 wherein spacer means are provided between the annular members to space the annular members a predetermined distance from each other to permit the flow of fluid therebetween in the open position of the valve plug, said spacer means comprising generally radially extending spacers between the ribs in contact with and secured to opposed body portions.

* * * * *